United States Patent
Aymeric et al.

(10) Patent No.: US 8,913,081 B2
(45) Date of Patent: Dec. 16, 2014

(54) METHODS OF MANAGING A PARAMETER DISPLAYED IN AN INTERACTIVE GRAPHIC OBJECT

(75) Inventors: Bruno Aymeric, Saint Medard en Jalles (FR); Denis Bonnet, Bordeaux (FR); Yannick Leroux, Le Haillan (FR); Joel Viala, Toulouse (FR)

(73) Assignee: Thales, Neuilly sur Seine (FR)

( * ) Notice: Subject to any disclaimer, the term of this patent is extended or adjusted under 35 U.S.C. 154(b) by 1257 days.

(21) Appl. No.: 12/639,673

(22) Filed: Dec. 16, 2009

(65) Prior Publication Data

US 2010/0156789 A1 Jun. 24, 2010

(30) Foreign Application Priority Data

Dec. 16, 2008 (FR) ..................................... 08 07058

(51) Int. Cl.
*G09G 5/00* (2006.01)
*G06F 3/0484* (2013.01)
*G06F 3/0486* (2013.01)

(52) U.S. Cl.
CPC .......... *G06F 3/0486* (2013.01); *G06F 3/04847* (2013.01)
USPC ........... 345/629; 345/619; 345/630; 345/640; 345/606; 345/173

(58) Field of Classification Search
None
See application file for complete search history.

(56) References Cited

U.S. PATENT DOCUMENTS

| | | | |
|---|---|---|---|
| 6,677,965 B1* | 1/2004 | Ullmann et al. | 715/786 |
| 2005/0178903 A1 | 8/2005 | Boorman et al. | |
| 2005/0203675 A1 | 9/2005 | Griffin, III et al. | |
| 2006/0098831 A1* | 5/2006 | Kaiser et al. | 381/312 |
| 2006/0282848 A1* | 12/2006 | Watanabe et al. | 725/37 |
| 2008/0174570 A1* | 7/2008 | Jobs et al. | 345/173 |

FOREIGN PATENT DOCUMENTS

| | | |
|---|---|---|
| FR | 2 882 439 A | 8/2006 |
| WO | WO 97/41495 A | 11/1997 |

* cited by examiner

*Primary Examiner* — Joseph Haley
*Assistant Examiner* — Ifedayo Iluyomade
(74) *Attorney, Agent, or Firm* — LaRiviere, Grubman PC

(57) ABSTRACT

The method of displaying the preceding value of a parameter displayed in a first interactive graphic object by means of a display device defining a display window, a computer making it possible to interpret the actions of a graphic pointer, the pointer comprising means of selecting the first graphic object, the pointer being able to be overlaid on the first graphic object on the display device, comprises:
  a step for positioning the pointer at at least one point of the frame of the first graphic object;
  a step for activation of the means of selecting the first graphic object and of displacing the pointer within a determined area engaging the displacement of the first graphic object, a second graphic object appearing under the first graphic object, the second graphic object including the preceding value of the current parameter.

11 Claims, 4 Drawing Sheets

METHODS OF MANAGING A PARAMETER DISPLAYED IN AN INTERACTIVE GRAPHIC OBJECT

PRIORITY CLAIM

This application claims priority to French Patent Application Number 08 07058, entitled Methods of Managing a Parameter Displayed in an Interactive Graphic Object, filed on Dec. 16, 2008.

FIELD OF THE INVENTION

The present invention relates to the field of cockpit display systems. More particularly, the invention relates to the display systems that include several interactive elements, called "interactive graphic objects."

BACKGROUND OF THE INVENTION

These interactions are usually carried out using a computer pointer, known by the English acronym CCD, standing for "Cursor Control Device," and which is mainly implemented by a mouse, and also certain implementations better known as touchpad, trackball and thumbsticks.

It is known that the function of these pointers is to position a cursor on graphic objects on a display screen in order to select them, activate them or modify them.

A major problem with these pointing means is that they introduce a latency in the effective use of the interactive graphic objects, since they require the cursor to be positioned on top of the object.

In the context of the use of a touch screen, if the cursor is considered solely as a simple means of interacting on the objects, the presence of this cursor becomes a priori unnecessary.

Nevertheless, whatever the means used to interact on these graphic elements, there arises the problem of cancelling the modification made at a given instant on these graphic objects.

With applications increasingly involving interactive elements, the validation of the integrity of the validated, modified or activated data requires great attention on the part of an operator or a pilot. Moreover, the proliferation of these elements promotes input or interpretation errors. The operator or the pilot must then be able to correct or check data as simply as possible.

Once a new value of a parameter is validated and it is displayed in an interactive graphic object, it is best for the operator or the pilot to be able to "see" or "retrieve" the preceding value in a simple manner.

At the present time, there is no interactive avionics system that makes it possible to simply cancel a modification made to an interactive graphic object.

In the context of the AIRBUS systems, in particular on the A380 which comprises display system having interactive graphic objects, it is not possible to directly cancel, on the interactive graphic objects, a modification made by the operator.

In the context of the Honeywell/Dassault EASY systems, nor is it possible to directly cancel, on the interactive graphic objects, a modification made by the operator.

In the current computer systems, the cancellation of an action is done at the application level, and not at the level of each interactive object. This architecture then necessitates cancelling all the queue of the modifications before arriving at the modification of the action undertaken on one graphic object in particular.

The invention makes it possible to overcome the above-mentioned drawbacks.

The invention comprises the implementation of an intuitive interaction on each interactive graphic object displayed in an application. The graphic object then includes the display of at least one parameter. The invention makes it possible to select the interactive graphic object and displace it outside of its initial position. The operator then sees a replica of the graphic object appear below, but with the preceding parameter value. A link is then created between the displaced graphic object and the replica of the graphic object so as to return to an initial position.

If the operator displaces the interactive object far enough away from its initial position, the link between the two interactive objects is broken and the displaced graphic object disappears, leaving the replica of the graphic object including the preceding parameter value.

If the operator displaces the graphic object within a determined area sufficiently close to the replica of the graphic object, and he releases the object, then the graphic object returns to its initial position. The cancellation of the value of the parameter is not taken into account.

SUMMARY OF THE INVENTION

The invention proposes a method of accessing a value contained in the history of the interactive graphic object and a method of cancelling the last action carried out on an interactive graphic object.

The crew then has a means of accessing a history of the values specified in each of the interactive graphic objects, and can intuitively return to these values.

It is not simply a method of cancelling the last action, but the last action on each interactive graphic object.

Advantageously, the method of managing a parameter displayed in a first interactive graphic object by means of a display device, said first graphic object having an appearance delimited by a frame, a behaviour and a functional interface, a computer making it possible to interpret the actions of a graphic pointer, the pointer comprising means of selecting the first graphic object, the pointer being able to be overlaid on the first graphic object on the display device, comprises:
 a first step for positioning the pointer in at least one point of the frame of the first graphic object;
 a second step for activation of the means of selecting the first graphic object and of moving the pointer in a determined area of the display window, the displacement of the pointer engaging the displacement of the first graphic object, a second graphic object appearing in the initial position of the first graphic object, the second graphic object comprising a history of the parameter.

Advantageously, the second step comprises the display of at least one graphic link forming a line joining the first and the second graphic objects, whose thickness decreases according to the distance of the first graphic object from its initial position.

Advantageously, a third step comprises a releasing of the selection of the first graphic object in the determined area, the first graphic object returning to its initial position so as to be overlaid on the second graphic object.

Advantageously, a third step comprises a releasing of the selection of the first graphic object outside the determined area, the first graphic object disappearing, the second graphic object then including the preceding current value of the parameter.

Advantageously, the history comprises a stack having a predefined number of the latest values of the parameter, the value included in the graphic object that has just been deleted being stored in the stack queue.

Advantageously, the pointer is a finger and the display device a touch screen, the selection means being a contact between the finger and the screen when the finger is superimposed on the graphic object, the displacement of the graphic object being handled by a displacement of the finger on the screen.

Advantageously, the pointer is a mouse and the selection means are a contact of the mouse cursor and a sustained click of the mouse.

Advantageously, the pointer can be a touchpad, a trackball or a thumbstick.

BRIEF DESCRIPTION OF THE DRAWINGS

Other characteristics and advantages of the invention will become apparent from the following description, given in light of the appended drawings that represent.

Hereinafter in the description, the term "interactive graphic object" will be used to mean an object comprising:
- an appearance, that is to say a graphic aspect;
- a behaviour, that is to say a reaction to the stimuli generated by the action of a user;
- a functional interface, that is to say the sending of an event, a command or a text, possibly to a computer.

DETAILED DESCRIPTION OF PREFERRED EMBODIMENT

Figure 1:
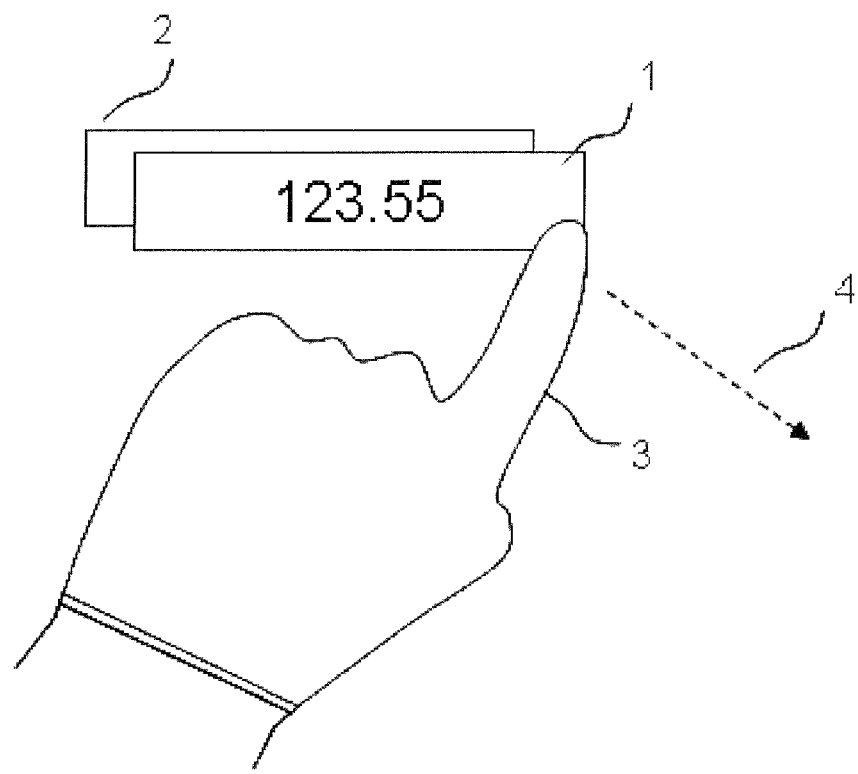
FIG. 1: a graphic object displayed on a screen whose selection is made by a touch contact.

FIG. 1 represents an embodiment comprising a touch screen displaying interactive graphic objects. An interactive graphic object 1 is represented displaying the value of a current parameter 123.55. The finger 3 of an operator in contact with the screen, when the latter is overlaid on the graphic object, can select it and displace it in a direction 4 of his choice. The graphic object, when displaced, leaves a replica 2 of the interactive graphic object containing the preceding value of the current parameter.

The invention applies to a set of interactive graphic objects gathered together in one and the same window of a display device. Each interactive graphic object comprises a history of values of the displayed parameters. It is then possible to access the preceding value of a parameter after the latter has been modified.

The action of selecting and displacing an interactive graphic object has no influence on the other graphic objects displayed in the window.

Figure 2:
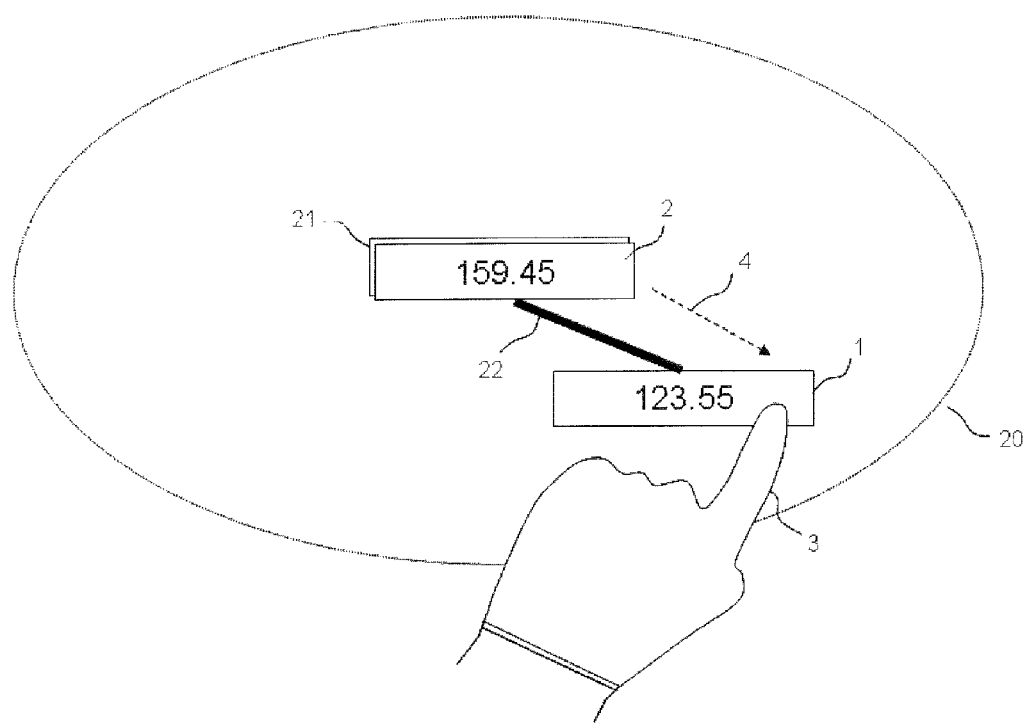
FIG. 2: a displacement of the selected graphic object within a determined area to a first distance.

FIG. 2 represents the interactive graphic object when displaced by the action of an operator by dragging his finger on the screen in a direction 4. The operator can then access the preceding value of the parameter contained in the replicated interactive graphic object 2, the latter appearing in the initial position of the interactive graphic object as displayed in its nominal mode. In the example of FIG. 2, the value of this latter parameter is 159.45.

The interactive graphic object 2 includes a parameter that has a new history 21.

One embodiment makes it possible to display a link 22, for example represented by a straight line linking the interactive graphic object 1 and its replica 2. Advantageously, the link 22 comprises a thickness that varies with the distance of the displaced interactive graphic object 1.

Figure 3:
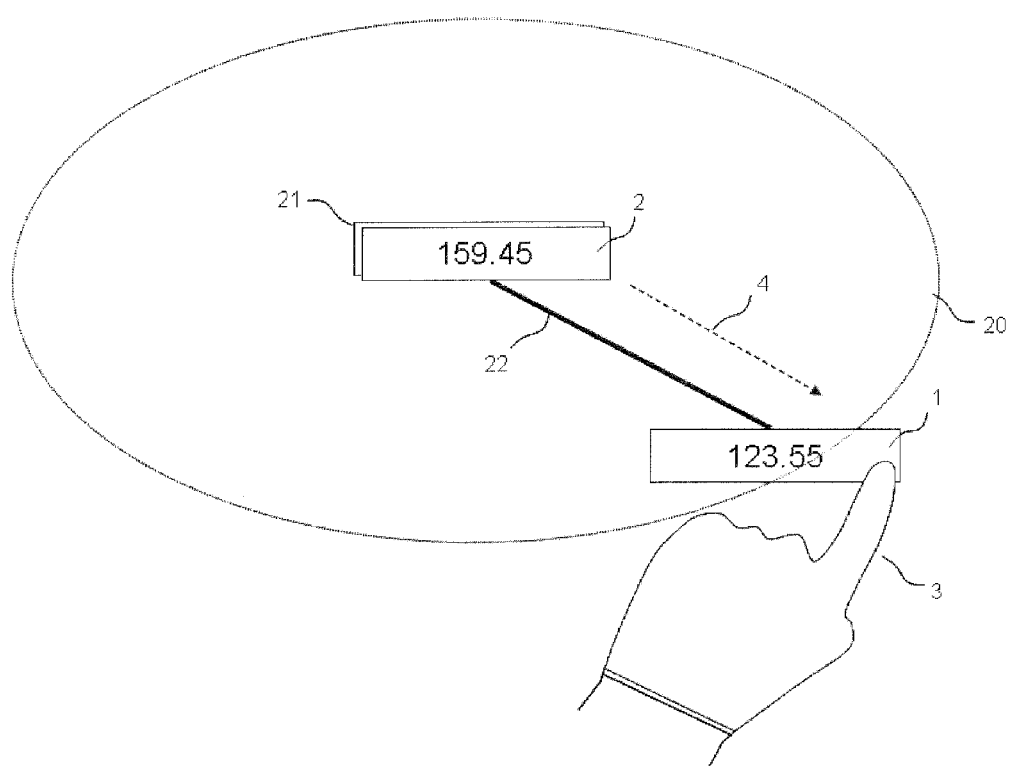
FIG. 3: a displacement of the selected graphic object within a determined area to a second distance.

FIG. 3 represents the displaced interactive graphic object 1 further away than in FIG. 2. The thickness of the link 22 is thinner than the thickness of the link 22 of FIG. 2.

Advantageously, the thickness of the link 22 being reduced with distance, a manipulator of the graphic object intuitively understands that the link between the displaced object 1 and the replicated object 2 is likely to be broken.

Figure 4:
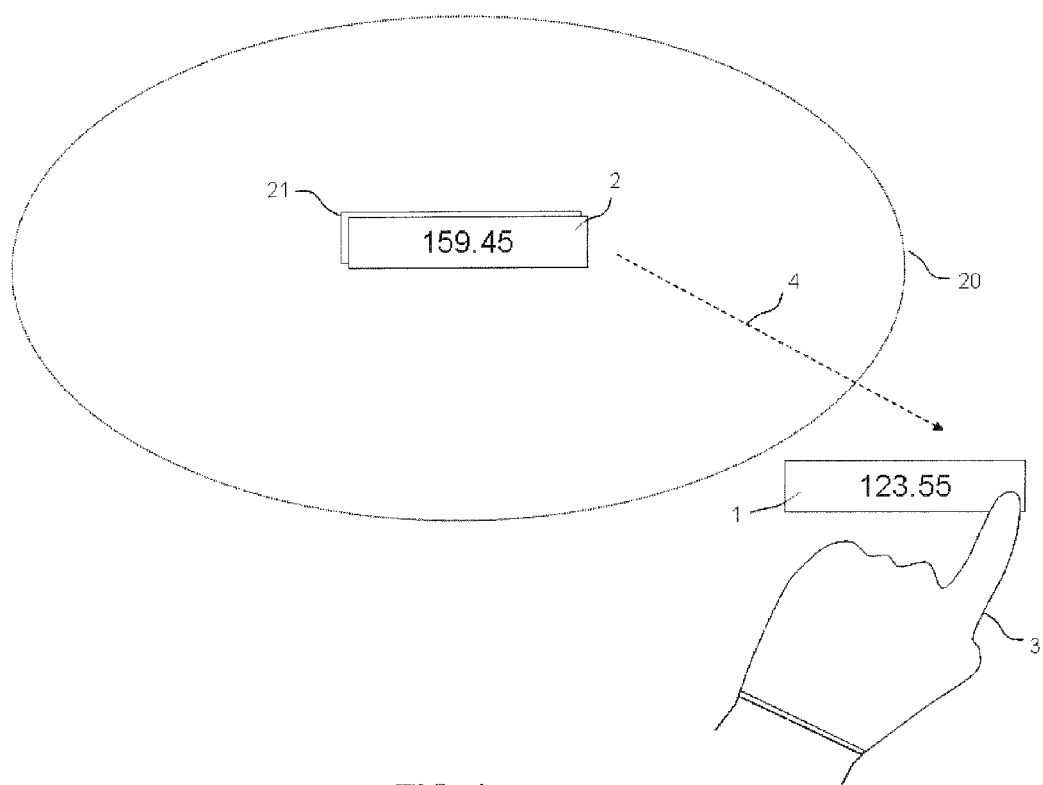
FIG. 4: a releasing of the selection of the graphic object outside the determined area.

The invention makes it possible to define a determined area 20 beyond which the two interactive graphic objects, the displaced object 1 and the replicated object 2, no longer have a link between them, as illustrated in FIG. 4. When the interactive graphic object goes beyond the area 20, the current value contained in the latter is cancelled and the new current display of the window comprises the replicated graphic object containing the preceding value of the displayed parameter.

One benefit of the representation of the link 22 is to enable the operator to guide his action without having to graphically represent the determined area 20. In practice, the thickness of the link 22 decreases with the distance of the displaced graphic object 1, from its initial position, until broken if the latter is displaced far enough.

On the other hand, if the object is not displaced beyond the determined area 20 as represented in FIG. 2 or 3, a releasing of the selection of the interactive graphic object 1 has the effect of repositioning it in its initial position corresponding to a nominal display mode state.

In another embodiment, the selection of a graphic object can be made by means of a mouse, a touchpad, a trackball or a thumbstick, to use the common terminologies employed.

According to the embodiments, the invention makes it possible to keep a history 21 of the parameter defining a list of the latest modified values.

The list is a stack containing a predefined number of the latest parameter values. Advantageously, the value included in the graphic object that has just been deleted is stored in the stack queue.

In a particular embodiment, the stack contains only two elements. This embodiment makes it possible, when a value has just been deleted by the displacement of a graphic object outside the determined area, to retrieve it easily by repeating the manipulation on the replicated graphic object, by removing it in turn from the determined area using the inventive method.

In the context of an interaction using a graphic cursor, the method, according to the invention, of displaying the preceding value comprises the following steps:
- positioning of the graphic cursor at a selection point located on the frame of the interactive graphic object;
- activation of the selection means, and displacement of the graphic cursor outside the interactive graphic object, the preceding value appearing;
- releasing of the selection within a determined area enabling the object to return to its initial position, with the current value.

In the context of the touch interactions, the method, according to the invention, of displaying the preceding value comprises the following steps:
- positioning of the finger of the operator at a selection point located on the frame of the interactive graphic object;
- displacement of the finger, still in contact with the screen, outside the interactive graphic object, the preceding value appearing;
- lifting of the finger from the screen within a determined area, allowing the graphic object to return to its initial position, with the current value.

In the context of an interaction using a graphic cursor, the method, according to the invention, of cancelling the value of a displayed parameter in order to return to its preceding value comprises the following steps:

positioning of the graphic cursor at a selection point located on the frame of the interactive graphic object;

activation of the selection means, and displacement of the graphic cursor outside of a determined area located around the interactive graphic object, the preceding value appearing;

releasing of the selection outside of the determined area, the displaced object disappearing and the replicated object remaining in the initial position with the preceding value.

In the context of a touch interaction, the method, according to the invention, of cancelling the value of a displayed parameter in order to return to its preceding value comprises the following steps:

positioning of the finger of the operator at a selection point located on the frame of the interactive graphic object;

displacement of the finger, still in contact with the screen, outside of the determined area, the preceding value then appearing.

lifting of the finger from the screen outside the determined area, the displaced object disappearing and the replicated object remaining in the initial position with the preceding value.

Advantageously, the proposed solution therefore provides the following benefits:

reduction in the effort on the part of the operator to memorize the cancelling means, the cancelling action becoming intuitive;

simplifying access to the preceding value on each interactive graphic object;

simplifying the cancellation of the latest modification on each interactive graphic object.

The invention claimed is:

1. Method of managing a parameter displayed in a first interactive graphic object by means of an interactive touch screen avionics display device, said first graphic object comprising a value of the parameter and having an appearance delimited by a frame, a behaviour and a functional interface, a computer making it possible to interpret the actions carried out by a user by means of a graphic pointing device, the pointing device comprising means of selecting the first graphic object, the pointing device being able to be overlaid on the first graphic object on the interactive touch screen avionics display device, wherein the method comprises:

a first step for positioning the pointing device in at least one point of the frame of the first graphic object;

a second step for activation of the means of selecting the first graphic object and of moving the pointing device in a determined area of the interactive touch screen avionics display device, the displacement of the pointing device engaging the displacement of the first graphic object, a second graphic object appearing in the initial position of the first graphic object, the second graphic object comprising a preceding value of the parameter for allowing a crew member to retrieve and display the preceding value of the parameter after the latter has been modified.

2. Method of managing a parameter displayed in a first interactive graphic object according to claim 1, wherein the second step comprises the display of at least one graphic link forming a line joining the first and the second graphic objects, whose thickness decreases according to the distance of the first graphic object from its initial position.

3. Method of managing a parameter displayed in a first interactive graphic object according to claim 2, wherein a third step comprises a releasing of the selection of the first graphic object in the determined area, the first graphic object returning to its initial position so as to be overlaid on the second graphic object.

4. Method of managing a parameter displayed in a first interactive graphic object according to claim 2, wherein a third step comprises a releasing of the selection of the first graphic object outside the determined area, the first graphic object disappearing, the second graphic object then including the preceding value of the parameter.

5. Method of managing a parameter displayed in a first interactive graphic object according to claim 4, wherein the second graphic object comprises a stack having a predefined number of the latest values of the parameter, the value included in the graphic object that has just been deleted being stored in the stack.

6. Method of managing a parameter displayed in a first interactive graphic object according to any one of claims 3 to 5, wherein the pointing device is a finger, the selection means being a contact between the finger and the screen when the finger is superimposed on the graphic object, the displacement of the graphic object being handled by a displacement of the finger on the screen.

7. Method of managing a parameter displayed in a first interactive graphic object according to any one of claims 3 to 5, wherein the pointing device is a mouse and the selection means are a contact of the mouse cursor and a sustained click of the mouse.

8. Method of managing a parameter displayed in a first interactive graphic object according to any one of claims 3 to 5, wherein the pointing device is a touchpad.

9. Method of managing a parameter displayed in a first interactive graphic object according to any one of claims 3 to 5, wherein the pointing device is a trackball.

10. Method of managing a parameter displayed in a first interactive graphic object according to any one of claims 3 to 5, wherein the pointing device is a thumbstick.

11. Method of managing a parameter displayed in a first interactive graphic object by means of an interactive touch screen avionics display device, said first graphic object having an appearance delimited by a frame, a behaviour and a functional interface, a computer making it possible to interpret the actions carried out by a user by means of a graphic pointing device, the pointing device comprising means of selecting the first graphic object, the pointing device being able to be overlaid on the first graphic object on the interactive touch screen avionics display device, wherein the method comprises:

a first step for positioning the pointing device in at least one point of the frame of the first graphic object;

a second step for activation of the means of selecting the first graphic object and of moving the pointing device in a determined area of the interactive touch screen avionics display device, the displacement of the pointing device engaging the displacement of the first graphic object, a second graphic object appearing in the initial position of the first graphic object, the second graphic object comprising a history of the parameter, wherein the history comprises a stack having a predefined number of the latest values of the parameter, the value included in the graphic object that has just been deleted being stored in the stack for allowing a crew member to retrieve and display the preceding value of the parameter after the latter has been modified.

* * * * *